US009991506B2

(12) United States Patent
Inoue (10) Patent No.: US 9,991,506 B2
(45) Date of Patent: Jun. 5, 2018

(54) ELECTRODE BINDER FOR LITHIUM SECONDARY BATTERIES, NEGATIVE ELECTRODE FOR LITHIUM SECONDARY BATTERIES USING SAME, LITHIUM SECONDARY BATTERY, AUTOMOBILE, METHOD FOR PRODUCING ELECTRODE BINDER FOR LITHIUM SECONDARY BATTERIES, AND METHOD FOR MANUFACTURING LITHIUM SECONDARY BATTERY (75) Inventor: Kazuhiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 14/114,954

(22) PCT Filed: Jun. 1, 2012

(86) PCT No.: PCT/JP2012/064257
§ 371 (c)(1),
(2), (4) Date: Oct. 31, 2013

(87) PCT Pub. No.: WO2012/165609
PCT Pub. Date: Dec. 6, 2012

(65) Prior Publication Data
US 2014/0077128 A1 Mar. 20, 2014

(30) Foreign Application Priority Data

Jun. 3, 2011 (JP) .................................. 2011-125348

(51) Int. Cl.
*H01M 4/62* (2006.01)
*H01M 4/36* (2006.01)
*H01M 4/04* (2006.01)
*H01M 4/133* (2010.01)

(52) U.S. Cl.
CPC ............ *H01M 4/364* (2013.01); *H01M 4/621* (2013.01); *H01M 4/622* (2013.01); *H01M 4/0404* (2013.01); *H01M 4/133* (2013.01)

(58) Field of Classification Search
CPC ................................................... H01M 4/622
See application file for complete search history.

(56) References Cited

U.S. PATENT DOCUMENTS

| 4,954,577 | A | 9/1990 | Dünwald et al. | |
|---|---|---|---|---|
| 6,077,628 | A | 6/2000 | Takechi et al. | |
| 2003/0170549 | A1* | 9/2003 | Murai | H01M 10/0567 429/329 |
| 2007/0181856 | A1* | 8/2007 | Park | C23C 24/00 252/500 |
| 2009/0136851 | A1* | 5/2009 | Choi | H01M 4/134 429/231.95 |
| 2010/0142872 | A1* | 6/2010 | Egami | B82Y 30/00 384/462 |
| 2011/0062379 | A1 | 3/2011 | Miyawaki et al. | |
| 2011/0091771 | A1* | 4/2011 | Sannan | C09D 5/002 429/217 |

FOREIGN PATENT DOCUMENTS

| CN | 101179126 A | 5/2008 |
|---|---|---|
| CN | 102024937 A | 4/2011 |
| JP | 5-140308 | 6/1993 |
| JP | 7-165912 | 6/1995 |
| JP | H9-100370 A | 4/1997 |
| JP | 2003-331848 | 11/2003 |
| JP | 3589321 | 11/2004 |
| JP | 2007-100079 | 4/2007 |
| JP | 2007-246680 | 9/2007 |
| JP | 2008-153117 | 7/2008 |

(Continued)

OTHER PUBLICATIONS

Office Action issued by the Chinese Patent Office in counterpart Chinese Patent Application No. 201280027298.4, dated Feb. 19, 2016.
Office Action issued by the Chinese Patent Office in counterpart Chinese Patent Application No. 201280027298.4, dated Jun. 1, 2015.
International Search Report dated Aug. 21, 2012.
Publication information providing filed with the Japanese Patent Office in counterpart Japanese Patent Application No. 2003-518183, dated Jan. 23, 2017.

(Continued)

*Primary Examiner* — Peter F Godenschwager
(74) *Attorney, Agent, or Firm* — Finnegan, Henderson, Farabow, Garrett & Dunner, L.L.P.

(57) ABSTRACT

Provided are an electrode binder for lithium secondary batteries, which is suppressed in deterioration in adhesive power, strength and stretchability caused by decomposition of imide groups by hydrolysis, said imide groups being contained in a polyamide-imide that is used as a binder for an electrode active material, and which is capable of prolonging the service life of a lithium secondary battery by suppressing deterioration of an electrode even in cases where water is generated due to repeated charging and discharging; a negative electrode for lithium secondary batteries; a lithium secondary battery; a method for manufacturing a lithium secondary battery having long service life, said lithium secondary battery being suppressed in deterioration of an electrode even in cases where water is generated due to repeated charging and discharging; a method for producing an electrode binder for lithium secondary batteries; and an automobile. This electrode binder for lithium secondary batteries contains a polyamideimide and a carbodiimide. A lithium secondary battery is manufactured by forming an electrode layer using a coating liquid that contains an electrode active material, a polyamideimide, a carbodiimide and a solvent.

14 Claims, 1 Drawing Sheet (56) References Cited

FOREIGN PATENT DOCUMENTS

| JP | 2008-243677   | 10/2008 |
| -- | ------------- | ------- |
| JP | 2010-135336   | 6/2010  |
| JP | 2010-285557 A | 12/2010 |
| JP | 2011-048969   | 3/2011  |
| JP | 2011-060676   | 3/2011  |

OTHER PUBLICATIONS

Notice of Reasons for Refusal, dated Nov. 21, 2017, issued by the Japanese Patent Office in counterpart Japanese Patent Application. No. 2017-043138.

\* cited by examiner (Fig. 1)

(Fig. 2)

ELECTRODE BINDER FOR LITHIUM SECONDARY BATTERIES, NEGATIVE ELECTRODE FOR LITHIUM SECONDARY BATTERIES USING SAME, LITHIUM SECONDARY BATTERY, AUTOMOBILE, METHOD FOR PRODUCING ELECTRODE BINDER FOR LITHIUM SECONDARY BATTERIES, AND METHOD FOR MANUFACTURING LITHIUM SECONDARY BATTERY

CROSS-REFERENCE TO RELATED PATENT APPLICATIONS

This application is a National Stage Entry of International Application No. PCT/JP2012/064257, filed Jun. 1, 2012, which claims priority from Japanese Patent Application No. 2011-125348, filed Jun. 3, 2011. The entire contents of the above-referenced applications are expressly incorporated herein by reference.

TECHNICAL FIELD

The present invention relates to an electrode binder for lithium secondary batteries, a negative electrode for lithium secondary batteries using the same, a lithium secondary battery, an automobile, a method for producing an electrode binder for lithium secondary batteries, and a method for producing a lithium secondary battery. More particularly, the present invention relates to an electrode binder for lithium secondary batteries which is capable of prolonging the service life of a lithium secondary battery, a negative electrode for lithium secondary batteries using the same, a lithium secondary battery, an automobile, a method for producing an electrode binder for lithium secondary batteries, and a method for producing a lithium secondary battery.

BACKGROUND

A lithium secondary battery which uses an organic solvent, absorbs and releases reversibly lithium ions in positive and negative electrodes and allows repeated charging/discharging has been widely used for applications such as potable electronic devices or personal computers, as well as for driving a motor in automobiles requiring high capacity or for energizing smart grids. There are needs for miniaturization and weight lightening in such a lithium secondary battery, and further there are major problems such as increasing amounts of lithium ions absorbing and releasing reversibly in positive and negative electrodes, more increasing energy density, reducing cycle deterioration in charging/discharging, and prolonging service life.

Such a lithium secondary battery has a structure configured by opposite-disposing a negative electrode active material layer having a negative electrode active material formed on a current collector and a positive electrode active material layer having a positive electrode active material formed on a current collector with a separator intervened therebetween within an outer body wherein the negative electrode active material and positive electrode active material are capable of absorbing and releasing reversibly lithium ions during charging/discharging, filling an electrolytic solution to immerse them, and sealing the outer body. The negative electrode active material layer and the positive electrode active material layer are formed of powders of electrode active materials mixed with a binder, and adhered on a current collector.

Such a binder should be stable in relation to lithium ions and electrolytic solution, as well as should have high strength, good stretchability and strong adhesive power to adhere electrode active materials each other and to the current collector without peeling from the electrode active material layer even if the electrode active material has large volume change during charging/discharging. As such a binder, a polyamideimide is preferably used in an electrode active material layer comprising an active material having large volume change, and lithium secondary batteries using a polyamideimide in an electrode active material layer has been reported. For example, it has been known the following items: a lithium secondary battery using a binder exemplified by a polyimide or a polyamideimide (Patent Document 1); the use of a polyamideimide resin comprising amide groups and imide groups at a specific ratio as a binder for a negative electrode active material in which silicon is dispersed in silicon oxide to improve initial charge/discharge effectiveness and cycle properties (Patent Document 2); the use of a polyamideimide resin having ionic groups at a specific ratio as a binder for a carbonaceous negative electrode active material to improve dispersability of the active material, increase an amount of the active material filled, enhance flexibility, and decrease crack or peeling due to winding (Patent Document 3); or the like.

However, since a polyamideimide has imide groups which are easily hydrolyzed, these imide groups are readily reacted with water and decomposed in cases where water is present in components of a battery as an impurity or water is generated due to repeated charging and discharging, overcharge, or the like. The decomposition of imide groups decreases strength, stretchability and adhesive power of a binder, and leads to rapid deterioration during repeated charging/discharging. In particular, for a motor-driving battery of an automobile or a power supply battery of a smart grid, which requires long service life, the use of a polyamideimide as a binder is problematic. Accordingly, there is a need for a lithium secondary battery in which stretchability is sufficient to follow a change in volume even when an electrode active material having large volume expansion during charge/discharge is used; adhesive power is good; strength is high; deterioration in electrodes is suppressed even when water is generated due to repeated charging/discharging; and service life is prolonged.

Patent Document 1: JP Patent Application Publication No. 2010-135336
Patent Document 2: JP Patent Application Publication No. 2011-060676
Patent Document 3: U.S. Pat. No. 3,589,321

SUMMARY OF THE INVENTION

It is an object of the present invention to provide an electrode binder for lithium secondary batteries, which is suppressed in deterioration in adhesive power, strength and stretchability caused by decomposition of imide groups by hydrolysis, said imide groups being contained in a polyamideimide that is used as a binder for an electrode active material, and which is capable of prolonging the service life of a lithium secondary battery by suppressing deterioration of an electrode even in cases where water is generated due to repeated charging and discharging; a negative electrode for lithium secondary batteries using the same; and a lithium secondary battery; as well as an automobile using the same. Further, it is another object of the present invention to provide a method for producing a lithium secondary battery having long service life, said lithium secondary battery being suppressed in deterioration of an electrode even in cases where water is generated due to repeated charging and discharging; and a method for producing an electrode binder for lithium secondary batteries.

The inventors have intensively studied, and have found that when a carbodiimide is contained in an electrode active material layer of a lithium secondary battery, the carbodiimide is reacted instantly with water in cases where water is generated due to repeated charging/discharging to suppress hydrolysis of imide groups present in a polyamideimide. Also, the inventors have found that even in cases where imide groups are hydrolyzed, carboxylic or amino groups generated by hydrolysis of imide groups are instantly bound to the carbodiimide to suppress deterioration in characteristics of polyamideimide as a binder for an electrode active material. Particularly, it has been found that a carbodiimide having an appropriate molecular weight can effectively retain functions of a binder such as excellent adhesive power, strength and stretchability. The inventors have completed the present invention based on these findings. Therefore, the present invention provides an electrode binder for lithium secondary batteries, which is capable of prolonging the service life of a lithium secondary battery by suppressing deterioration of an electrode even in cases where water is generated due to repeated charging and discharging; a lithium secondary battery using the same; and methods for producing them.

In an aspect, the present invention provides an electrode binder for lithium secondary batteries comprising a polyamideimide and a carbodiimide.

In another aspect, the present invention provides a negative electrode having a negative electrode active material layer comprising the electrode binder for lithium secondary batteries and a negative electrode active material containing silicon oxide; a lithium secondary battery having an electrode active material layer comprising the electrode binder for lithium secondary batteries and an electrode active material; and an automobile using the same.

In another aspect, the present invention provides a method for producing an electrode binder for lithium secondary batteries comprising mixing a polyamideimide, a carbodiimide and a solvent; and a method for producing a lithium secondary battery comprising forming an electrode layer using a coating liquid comprising an electrode active material, a polyamide-imide, a carbodiimide and a solvent.

According to the present invention, an electrode binder for lithium secondary batteries can be provided, which is suppressed in deterioration in adhesive power, strength and stretchability caused by decomposition of imide groups by hydrolysis, and which is capable of prolonging the service life of a lithium secondary battery by suppressing deterioration of an electrode even in cases where water is generated due to repeated charging and discharging. In addition, by using a lithium secondary battery of the present invention, an automobile can be provided, which is prolonged in the service life of a power supply for driving a motor.

BRIEF DESCRIPTION OF THE DRAWINGS

FIG. 2 is a schematic view illustrating an automobile according to the present invention.
1 Negative electrode active material layer
2 Negative current collector
3 Negative electrode
4 Positive electrode active material layer
5 Positive current collector
6 Positive electrode
7 Separator
8 Laminate film outer body
11 Layered laminate secondary battery
100 Automobile
110 Assembled battery (Lithium secondary battery)

DETAILED DESCRIPTION OF THE INVENTION

[Electrode Binder for Lithium Secondary Batteries]

An electrode binder for lithium secondary batteries (hereinafter, it is also referred to as a binder) according to the present invention, which is an electrode binder for lithium secondary batteries to adhere and integrate electrode active materials, contains a polyamideimide and a carbodiimide.

Any polyamideimide having an amide bond (—NHCO—) and an imide bond (—N(CO—)$_2$) may be used. The polyamideimide comprises preferably monomer units of an aromatic amide and an aromatic imide having an imide ring condensed with a benzene ring. Also, the polyamideimide is preferably dissolved or dispersed well in a solvent to facilitate the preparation of a coating liquid and to form an electrode active material layer by coating, as described below.

A molar fraction of amide groups with respect to the total moles of amide groups and imide groups present in the polyamideimide is preferably 25 mole % or more, more preferably 30 mole % or more and even more preferably 40 mole % or more. Also, a molar fraction of amide groups with respect to the total moles of amide groups and imide groups present in the polyamideimide is preferably not more than 99 mole %, more preferably not more than 90 mole % and even more preferably not more than 80 mole %. If the molar fraction of amide groups is 25 mole % or more, solubility in a solvent may be obtained and an electrode active material layer may be easily formed. If the molar fraction of amide groups is not more than 99 mole %, an electrode active material layer may have sufficient strength.

A number average molecular weight (Mn) of the polyamideimide is preferably in the range of 5,000-100,000 and more preferably 5,000-50,000. The number average molecular weight may be measured in terms of standard polystyrene using gel permeation chromatography (GPC). If the number average molecular weight of the polyamideimide is 5,000 or more, the polyamide-imide may have processability sufficient to form an electrode active material layer. If the number average molecular weight is not more than 100,000, the polyamideimide may suppress getting high viscosity and lowering of wettability and keep good formability to form a uniform electrode active material layer.

As such polyamideimide, a polyamideimide represented by formula (1) may be formed by polycondensation of an aromatic diamine $R^1(NH_2)_2$ and an aromatic tricarboxylic acid having three carboxyl groups $R^2(COOH)_3$.

(1)

where $R^1$ denotes an aromatic group, and $R^2$ denotes an aromatic residue to which an imide ring is condensed.

Examples of the aromatic diamine may include 4,4'-phenylenediamine, 4,4'-diphenylmethane-diamine which is also referred to as 4,4'-diaminodiphenylmethane, 4,4'-diphenyl ether diamine which is referred to as 4,4'-diaminodiphenyl ether or the like.

Examples of the aromatic tricarboxylic acid may include trimellitic acid, those having a structure in which two carboxyl groups are coupled to neighboring carbons in a benzene ring, or the other carboxyl group is coupled to another benzene ring or a substituent of the benzene ring. Also, two carboxyl groups coupled to neighboring carbons in a benzene ring may form an anhydride.

A reaction of the aromatic diamine and the aromatic tricarboxylic acid may be solution polymerization, and if necessary, heat addition to form an amide bond through a reaction of an amino group and a carboxylic group. The amide bond may be formed in an imide ring to produce a polyamideimide. A carbodiimide is added to the resulting polymer solution to produce a binder, and an electrode active material is further added to the solution to produce a coating liquid for forming an electrode active material layer.

Also, as such polyamideimide, a polyamideimide represented by formula (2) may be formed by polycondensation of an aromatic isocyanate ($R^3(NCO)_2$) instead of the aromatic diamine and an anhydrous trimellitic acid (HOOC—$R^4(C(=O)—O—C(=O))$).

(2)

where $R^3$ denotes an aromatic group, and $R^4$ denotes an aromatic residue to which an imide ring is condensed.

Examples of the aromatic diisocyanate may include 1,4-phenylene diisocyanate which is also referred to as 1,4-diisocyanobenezene, 4,4'-diphenyl-methane diisocyanate which is also referred to as diphenylmethane-4,4'-diisocyanate, 4,4'-diphenyl ether diisocyanate which is also referred to as diphenylether-4,4'-diisocyanate or the like.

Preferably, functional groups in the polyamideimide are blocked using a blocking agent. If functional groups in the polyamideimide are reacted with the carbodiimide, the viscosity of a coating liquid is increased, and it is difficult to perform a coating process when forming an electrode active material layer by the coating process. For example, the functional groups of the polyamideimide may include functional groups having active hydrogen such as a terminal carboxyl group, an amino group or a hydroxyl group, as well as other functional groups such as an isocyanate group. The blocking agent has preferably only one not more than one functional group to react well with these groups. As the blocking agent, for example, a monoamine, a monoalcohol, a monocarboxylic acid, a carboxylic acid anhydride, a monoisocyanate or the like may be used. They may be used alone or as a combination of two or more species.

The carbodiimide is not particularly limited as long as it has a carbodiimide group —N=C=N—. The carbodiimide group is readily reacted with water to form a urea bond. Also, the carbodiimide group has high reactivity with a carboxyl or an amino group generated by hydrolysis of imide groups present in the polyamideimide, so that a carbamoyl amide or a guanidine is formed as shown below.

By these reactions, the carbodiimide is coupled to a carboxyl or an amino group generated by hydrolysis of imide groups present in the polyamideimide, so that the deterioration of binder property due to hydrolysis of imide groups may be suppressed.

The carbodiimide may be aliphatic carbodiimides or aromatic carbodiimides.

The carbodiimide may be formed by condensation reaction of isocyanate associated with deletion carbon dioxide, and a polycondensate of a trimer or more of diisocyanates (hereinafter, it is also referred to as polycarbodiimide) is preferably used since the molecular weight of the carbodiimide may be easily controlled. Such a condensation polymer of diisocyanate may be obtained by condensation of diisocyanate with deletion carbon dioxide using a catalyst such as 3-methyl-1-phenyl-2-phosphorane-1-oxide, and may be represented by the following formula.

$$OCN(-R^5-N=C=N-)_nR^5NCO$$

where $R^5$ denotes a diisocyanate residue, and may be any of an aromatic group or an aliphatic group. It prefers that 'n' is an integer of 2 or more, and preferably 5-100 since the carbodiimide has the molecular weight indicated below. If n is 5 or more, a stable carbodiimide is obtained. If n is 100 or less, a carbodiimide has solubility in a solvent.

Specific examples of such diisocyanates include 1,5-naphthylene diisocyanate, 4,4'-diphenyl methane diisocyanate, 4,4'-(2,2-diphenylpropane)diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclo-hexane-1,4-diisocyanate, xylylene diisocyanate, isophorone diisocyanate, dicyclohexyl methane-4,4'-diisocyanate (HMDI), methylcyclohexane diisocyanate, tetramethylxylylene diisocyanate (TMXDI), 3,3',5,5'-tetraisopropylbiphenyl diisocyanate, or the like. These diisocyanates may be used alone or as a combination of two or more species.

Terminal isocyanates of these diisocyanate condensation polymers may be blocked using a blocking agent. A blocking agent such as phthalic anhydride, monoamine, monocarboxylic acid or monoalcohol may be used.

As commercially available carbodiimides, Carbodilite LA-1 (aliphatic diisocyanate: manufactured by NISSHINBO), Carbodilite V-05 (aromatic diisocyanate: manufactured by NISSHINBO), Carbodilite V-02B (isocyanate end-blocked: manufactured by NISSHINBO), Stabaxol P (aromatic diisocyanate: manufactured by Rhein Chemie), or the like may be used.

A number average molecular weight of the carbodiimide is preferably 3,000 or more, more preferably 5,000 or more. It is preferably 50,000 or less, and more preferably 10,000 or less. If the number average molecular weight of the carbodiimide is 3,000 or more, the carbodiimide group is effectively coupled to a carboxyl or an amino group generated by hydrolysis of imide groups present in the polyamideimide, so that the binder property of the polyamideimide for an electrode active material may be maintained. If the number average molecular weight is not more than 50,000, the carbodiimide has high dispersibility in the polyamideimide to restore an opened imide group.

A content of the carbodiimide in the binder is preferably 0.5% or more by mass and more preferably 1% or more by mass with respect to the polyamideimide. Also, a content of the carbodiimide is preferably not more than 20 wt %, more preferably not more than 10 wt % and even more preferably not more than 5 wt % with respect to the polyamideimide. If the content of the carbodiimide is 0.5 wt % or more, an opened imide ring of the polyamideimide may be sufficiently restored. If the content of the carbodiimide is not more than 20 wt %, the binder property of the polyamideimide may be maintained for a long time.

The binder may contain additional additives as long as they do not affect the polyamideimide or the isocyanate. The additional additives may include an electroconductive additive.

The binder may be prepared by mixing and stirring a polyamideimide, a carbodiimide, and an electroconductive additive as necessary in a solvent. Also, to form an electrode active material layer, the binder may be prepared by mixing a polyamideimide, a carbodiimide and additional additives along with electrode active materials in a solvent.

[Lithium Secondary Battery]

A lithium secondary battery according to the present invention is not particularly limited as long as the binder described herein is used in either one or both of a negative electrode active material layer and a positive electrode active material layer. The lithium secondary battery may have a structure that the negative electrode active material layer and the positive electrode active material layer comprising respective electrode active materials and the binder on a respective current collector are disposed opposite each other with a separator intervened therebetween and the whole unit is placed within an outer body filled with an electrolytic solution.

The lithium secondary battery may retain the properties of electrode active material layers even when water is generated due to repeated charging and discharging, and hence charging and discharging may be satisfactorily repeated for a prolonged period. Therefore, the lithium secondary battery may be used as a battery for driving a motor of an automobile.

[Negative Electrode]

A negative electrode is one having a negative electrode active material layer on a negative current collector. The negative electrode active material layer comprises a negative electrode active material which is capable of absorbing and releasing lithium ions during charging and discharging. For example, as the negative electrode active material, silicon-based substances, carbonaceous substances, metals, metal oxides or the like may be used. Examples of silicon-based substances may include silicon and/or silicon oxides such as SiO or $SiO_2$. Examples of carbonaceous substances may include graphite, hard carbon or the like. Examples of metals may include metals such as Sn, Al, Si, Pb, S, Zn, Cd, Sb, In, Bi or Ag, alloys of two or more species thereof, or alloys of these metals or alloys and lithium. Examples of metal oxides may include tin oxide, aluminum oxide, indium oxide, zinc oxide, lithium oxide, lithium iron oxide, tungsten oxide, molybdenum oxide, copper oxide, tin oxides such as SnO or $SnO_2$, niobium oxide, $Li_xTi_{2-x}O_4 (1 \leq x \leq 4/3)$, lead oxides such as $PbO_2$ or $Pb_2O_5$, or the like. The negative electrode active material layer may also comprise other substances such as metal sulfides such as SnS or $FeS_2$, polyacene or polythiophene, or lithium nitrides such as $Li_5(Li_3N)$, $Li_7MnN_4$, $Li_3FeN_2$, $Li_{2.5}Co_{0.5}N$ or $Li_3CoN$. They may be used alone or in a combination of two or more species.

Among others, silicon-based substances, carbonaceous substances and tin-based substances such as tin or tin oxides are preferred because they have large capability of absorbing and releasing lithium ions, and it is preferred to contain one or two or more species selected from these compounds. In particular, silicon oxides having large volume change during charging and discharging may be effectively used herein. These substances are adhered by the binder to form the negative electrode active material layer.

A content of the negative electrode active material in the negative electrode active material layer is preferably between 70 wt % and 99 wt %. If the content of the negative electrode active material is 70 wt % or more, the energy density of an electrode may be increased. If the content is not more than 99 wt %, adhesion between negative electrode active materials and between the negative electrode active materials and the current collector may be enhanced.

Also, as a binder for negative electrodes to adhere and integrate powders of negative electrode active materials, the binder described herein is used in said negative electrode active material layer. A content of the binder in the negative electrode active material layer is preferably 1 wt % or more and more preferably 5 wt % or more. A content of the binder in the negative electrode active material layer is preferably not more than 30 wt %, more preferably not more than 20 wt %. If the content of the binder is in said range, negative electrode active materials are adhered to form a negative electrode having high energy density.

A material capable of serving as a binder may also be used as long as it does not adversely affect the binder described herein. Examples of other binders may include polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamide, polyacrylate, or the like. A content of binders other than the polyamideimide in the negative electrode active material layer may be 0.1-20 wt % of the negative electrode active material layer.

The negative electrode active material layer may also contain an electroconductive additive to increase electron conductivity. As the electroconductive additive, for example, carbon black or acetylene black may be used. A content of the electroconductive additive may be 1-10 parts by weight with respect to 100 parts by weight of negative electrode active materials.

Any current collector may be used as the negative electrode current collector as long as it has conductivity enough to allow a conductive connection with an external terminal and supports the negative electrode active material layer. As a material for the negative electrode current collector, copper, aluminum, titanium, nickel, silver or an alloy thereof may be used. A shape of the negative electrode current collector may be any of foil, flat or mesh shape. A thickness of the negative electrode current collector may be, for example 4-100 μm, and it is preferred to have a thickness of 5-30 μm to increase energy density.

The negative electrode may be prepared by providing a coating liquid of a negative electrode active material obtained by blending negative electrode active materials, the binder described herein and an electroconductive additive as necessary in a solvent, for example N-methyl-2-pyrrolidone (NMP), and coating the coating liquid onto a negative electrode current collector such as copper foil by a doctor blade or a die coater to form a coating film. Additionally, a rolling process is performed to form a coated flat plate, or alternatively a direct press process is performed to form a compressed flat plate. Also, after coating, a coating film may be dried to form the negative electrode active material layer.

[Positive Electrode]

A positive electrode is one having a positive electrode active material layer on a positive current collector. As a positive electrode active material used in the positive electrode active material layer, substances capable of absorbing and releasing lithium ions during charging and discharging, for example, layered-type lithium manganates such as $LiMnO_2$ or $Li_xMn_2O_4$ ($0<x<2$), spinel-type lithium manganates, $LiCoO_2$, $LiNiO_2$, those in which some of transition metals present in the foregoing compounds are substituted by other metals, olivine compounds such as $LiFePO_4$ and $LiMnPO_4$, $Li_2MSiO_4$ (M is at least one of Mn, Fe and Co), or the like may be used. They may be used alone or in a combination of two or more species.

The positive electrode active material layer contains a binder for positive electrodes to adhere and integrate powders of positive electrode active materials, and to facilitate adhesion on a current collector. The binder for positive electrodes may be contained at the same ratio as the binder for negative electrodes. Also, additional other binders as described for the binder for negative electrodes may be contained at the same ratio as described for the binder for negative electrodes as long as they do not adversely affect the binder for positive electrodes.

As with the negative electrode active material layer, the positive electrode active material layer may contain an electroconductive additive to increase electron conductivity. As the electroconductive additive, specifically the same substances as used in the negative electrode active material layer may be used. A content of the electroconductive additive in the positive electrode active material layer may be 3-5 parts by mass with respect to 100 parts by mass of the positive electrode active material.

Any current collector may be used as the positive electrode current collector as long as it has conductivity enough to allow a conductive connection with an external terminal and supports the positive electrode active material layer. For the positive electrode current collector, the same material, shape and thickness as the negative electrode current collector may be used.

The positive electrode may be formed on a positive electrode current collector such as an aluminum foil by the same method as described for the negative electrode, using a coating liquid of a positive electrode active material obtained by blending positive electrode active materials, the binder described herein and an electroconductive additive as necessary in a solvent, for example N-methyl-2-pyrrolidone (NMP).

[Electrolytic Solution]

An electrolytic solution used herein is prepared by dissolving electrolytes in a non-aqueous organic solvent and allows solubilization of lithium ions. The positive electrode and the negative electrode are immersed in the electrolytic solution, so that these layers can perform reversible reactions with lithium ions during charging and discharging.

Preferably, the solvents used in the electrolytic solution is stable to oxidation and reduction potentials of lithium in repetitive charge/discharge and has liquidity enough to immerse the positive and negative electrodes, so that service life may be prolonged. Examples of solvents used in the electrolytic solution may include cyclic carbonates such as propylene carbonate (PC), ethylene carbonate (EC), butylene carbonate (BC) and vinylene carbonate (VC); chain carbonates such as dimethylcarbonate (DMC), diethylcarbonate (DEC), ethylmethylcarbonate (EMC) or dipropylcarbonate (DPC); aliphatic carboxylic acid esters such as methyl formate, methyl acetate or ethyl propionate; γ-lactones such as γ-butyrolactone; chain ethers such as 1,2-ethoxyethane (DEE) or ethoxymethoxyethane (EME); cyclic ethers such as tetra-hydrofuran or 2-methyltetrahydrofuran; aprotic organic solvents such as dimethylsulfoxide, 1,3-dioxolane, formamide, acetoamide, dimethylformamide, dioxolane, acetonitrile, propyl nitrile, nitromethane, ethylmonoglyme, phosphate triester, trimethoxymethane, dioxolane derivatives, sulforane, methylsulforane, 1,3-dimethyl-2-imidazolidinone, 3-methyl-2-oxazolidinone, propylene carbonate derivatives, tetrahydrofuran derivatives, ethylether, 1,3-propanesultone, anisole, N-methylpyrrolidone; or others. These solvents may be used alone or as a combination of two or more species.

As electrolytes that are contained in the electrolytic solution, lithium salts are preferably used. Examples of lithium salts may include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_3$, $LiN(CF_3SO_2)_2$, $LiN(C_2F_5SO_2)_2$, $LiB_{10}Cl_{10}$, lower aliphatic lithium carboxylate, chloroborane lithium, lithium tetraphenylborate, LiBr, LiI, LiSCN, LiCl, imides, boron fluorides, or the like. They may be used alone or as a combination of two or more species.

Alternatively, a gel electrolyte impregnated into a polymer such as polyacrylonitrile or polyacrylate, a solid electrolyte such as LiPON or $Li_2$—$LiPxOy$ (x=1 or 2, y=2-4), an ionic liquid such as quaternary ammonium salt-imide salt, or the like may be used instead of the electrolytic solution.

A concentration of the electrolyte in the electrolytic solution is preferably within the range of 0.01 mol/L to 3 mol/L, and more preferably the range of 0.5 mol/L to 1.5 mol/L. If the concentration of the electrolyte is in said ranges, a battery having improved stability, increased reliability, and lowered environmental effect may be obtained.

[Separator]

Any separator may be used as long as it suppresses a contact between the positive electrode and the negative electrode, allows penetration of charge carriers, and has durability in the electrolytic solution. Specific materials suitable for the separator may include polyolefin, for example polypropylene or polyethylene based microporous membranes, celluloses, polyethylene terephthalate, polyimide, polyfluorovinylidene, and the like. They may be used as a form such as porous film, fabric or nonwoven fabric.

[Cell Outer Body]

Preferably, the outer body should have strength to stably hold the positive electrode, the negative electrode, the separator and the electrolytic solution, is electrochemically stable to these components, and has water-tightness. As the material of the outer body, for example, stainless steel, nickel-plated iron, aluminum, titanium, or alloys thereof or those plating, metal laminate resins, or the like may be used. As resins for the metal laminate resins, polyethylene, polypropylene, polyethylene terephthalate, or the like may be used. They may be used as a structure of a single layer or two or more layers.

[Manufacture Method of Lithium Secondary Battery]

As a method for manufacturing the lithium secondary battery described herein, any method of forming an electrode layer using a coating liquid comprising an electrode active material, a polyamideimide, a carbodiimide and a solvent may be used. The lithium secondary battery may be manufactured by coating the coating liquid on a current collector to form a coating film serving as an electrode active material layer. Negative and positive electrodes having a respective active material layer formed on a respective current collector are disposed with a separator intervened therebetween within an outer body, an electrolytic solution is filled in the outer body, and the outer body is sealed, so that the lithium secondary battery may be manufactured.

[Charge/Discharge]

For the lithium secondary battery described herein, charge/discharge is preferably performed in the range of 2.7V to 4.2V. If discharge terminal voltage is 2.7V or more, deterioration in discharge capacity during repeated charging and discharging may be suppressed, and a circuit may easily be designed. If discharge terminal voltage is not more than 4.2V, decreasing absolute value in discharge capacity may be prevented, and the discharge capacity of the negative electrode active material may be effectively used.

[Lithium Secondary Battery]

A form of the lithium secondary battery described herein may have any of cylindrical, flat winding rectangular, stacked rectangular, coin, flat winding laminate or stacked laminate forms. The lithium secondary battery is preferably used in an automobile for driving a motor of the automobile.

Figure 1:
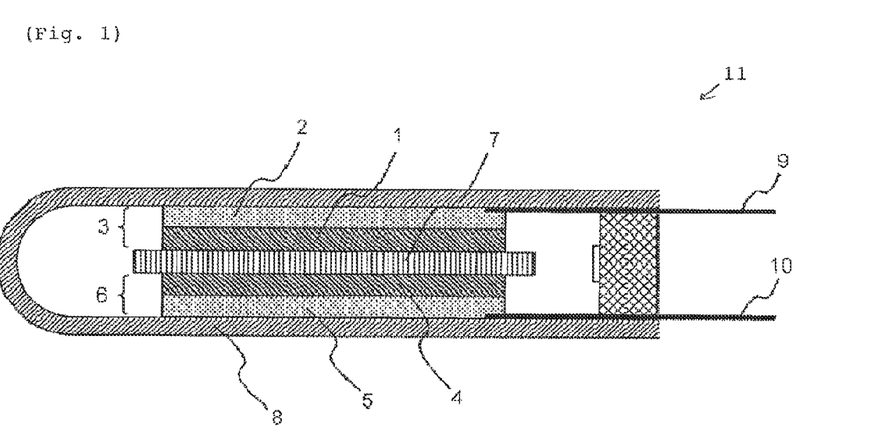
FIG. 1 is a schematic view illustrating an example of a lithium secondary battery according to the present invention.

As the lithium secondary battery described herein, for example, a layered laminate secondary battery is shown in FIG. 1. This layered laminate secondary battery 11 has a structure that a negative electrode 3 comprising a laminated negative current collector 2 and negative electrode active material layer 1 and a positive electrode 6 comprising a laminated positive current collector 5 and positive electrode active material layer 4 are disposed opposite each other with an intervened separator 7 that prevents a contact, and they are accommodated within a laminate film outer body 8. An electrolytic solution is filled in the inside of the laminate film. A negative lead tab 9 connected to the negative current collector 2 and a positive lead tab 10 connected to the positive current collector 5 are drawn outwardly from the laminate film 8 to use electrode terminals.

[Automobile]

An automobile according to the present invention is not particularly limited as long as it has the lithium secondary battery described herein. The automobile may include electric cars and hybrid cars.

Figure 2:
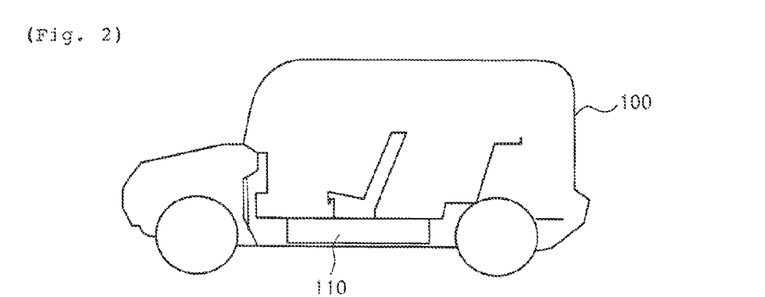

As an example of the automobile according to the present invention, an automobile using an assembled battery in which a plurality of the lithium secondary batteries described herein are connected to each other in series or in parallel is shown in FIG. 2. The automobile shown in FIG. 2 has an assembled battery 110 of the lithium secondary batteries described herein mounted under a seat in the center of a car body 100.

EXAMPLES

Now, the lithium secondary battery according to the present invention will be described in detail.

Example 1

[Preparation of Negative Electrode]

To a flask, 0.303 M of 4,4'-diphenylmethane diisocyanate (MDI), 0.300 M of anhydrous trimellitic acid (TMA) and 1400 g of N-methyl-2-pyrrolidone (NMP) were added and heated to 120° C. in about 3 hrs with stirring. Then 0.003 M of anhydrous phthalic acid was added and maintained at 120° C. for 5 hrs to give a solution in which a concentration of the polyamideimide represented by formula (3) (PAI-A, the number average molecular weight 41,000) obtained as a final polymer was 7 wt %.

(3)

Using an artificial massive graphite powder having the average particle size of 20 μm, the average aspect ratio of 1.4 and the specific surface area of 1 m²/g as a negative electrode active material, PAI-A, carbon black and carbodiimide (V02-B (isocyanate end-blocked) from NIS-SHINBO) at mass ratio of 89:9.9:1:0.1, a coating liquid for a negative electrode active material layer was prepared by dispersing these materials uniformly in N-methylpyrrolidone (NMP). This coating liquid was coated on a copper foil of 15 μm thickness as a negative electrode current collector. Then, NMP was evaporated at 125° C. for 10 min. Then, a press process is performed to fabricate a negative electrode having a negative electrode active material layer on one surface. After drying, the total amount of negative electrode materials per unit area was 0.008 g/cm².

[Preparation of Positive Electrode]

Using a powder of $LiMn_2O_4$ having the average particle size of 10 μm as a positive electrode active material, PVDF as a binder and a carbonaceous powder as an electroconductive additive at mass ratio of 92:4:4, a coating liquid for a positive electrode active material layer was prepared by dispersing these materials uniformly in NMP. This coating liquid was coated on an aluminum foil of 20 nm thickness as a positive electrode current collector. Then, NMP was evaporated at 125° C. for 10 min to fabricate a positive electrode having a positive electrode active material layer. After drying, the total amount of positive electrode materials per unit area was 0.025 g/cm².

[Preparation of Electrolytic Solution]

An electrolytic solution was prepared by dissolving 1 mol/L $LiPF_6$ as an electrolyte in a mix solution of EC:DEC=30:70% by volume and adding 1 wt % of vinylene carbonate as an additive in the solution.

[Preparation of Laminate Secondary Battery]

Each of the positive electrode and the negative electrode was cut into 5 cm (width)×6.0 cm (length). The active material layer was formed as the size of 5 cm×5 cm, and 5 cm×1 cm area of one side of each electrode current collector having no active material layer was formed as a connecting part for a terminal tab. An aluminum positive electrode tab having width 5 mm, length 3 cm, thickness 0.1 mm was welded by ultrasound to the connecting part for a positive electrode terminal tab, and a nickel negative electrode tab having the same size as the positive electrode tab was welded by ultrasound to the connecting part for a negative electrode terminal tab. A separator having 6 cm×6 cm made from polyethylene and polypropylene was intervened between the negative electrode active material layer and the positive electrode active material layer disposed opposite each other to fabricate an electrode laminate. Two aluminum laminate films having 7 cm×10 cm were layered and their three sides except one long side were thermal fused to form a bag type laminate outer body. From an opening of the laminate outer body the electrode laminate was inserted up to 1 cm to the base, and 0.203 g of the electrolytic solution was injected to immerse the electrode laminate under vacuum. The opening was sealed by thermal fusing under reduced pressure to fabricate a laminate secondary battery. The injected electrolytic solution amount was 1.5 times of void volume that was included in the electrode laminate comprising the negative electrode, the positive electrode and the separator. Also, the void volume was calculated from a difference between the apparent specific gravity of each member and the true specific gravity of materials constituting each member.

coated on the negative electrode was measured. A ratio of said area to an area that the negative electrode active material layer was initially formed was calculated, and adhesion maintenance of the negative electrode active material layer during the charge/discharge cycle was determined. The result is shown in Table 1.

Example 2

A laminate secondary battery was fabricated using the same method as in Example 1 except for preparing a coating liquid for a negative electrode active material layer in which the mass ratio of artificial massive graphite powder, PAI-A, carbon black and carbodiimide was changed to 89:9.5:1:0.5. The same charge/discharge cycle as in Example 1 was performed, and adhesion maintenance of a negative electrode active material layer was determined. The result is shown in Table 1.

Example 3

A laminate secondary battery was prepared using the same method as in Example 1 except for preparing a coating liquid for a negative electrode active material layer in which the poly-amideimide (PAI-B, the number average molecular weight 42,000) represented by formula (4) obtained using 4,4'-oxydiphenyl diisocyanate was used instead of 4,4'-diphenylmethane diisocyanate (MDI). The same charge/discharge cycle as in Example 1 was performed, and adhesion maintenance of a negative electrode active material layer was determined. The result is shown in Table 1.

(4)

[Maintenance of Negative Electrode Active Material Layer]

The resulting laminate secondary battery was subjected to a cycle test. Specifically, the battery was charged up to 4.2V at the constant current of 60 mA, and additionally charged at the constant voltage of 4.2V for the total charge time 2.5 hrs. Then, the battery was discharged up to 3.0V at the constant current of 60 mA. This charge/discharge cycle was repeated 5,000 times. The test temperature was 60° C., which was exam for purpose of deterioration and acceleration tests under elevated temperature. Finally, the battery was disassembled, and the negative electrode was placed in DEC in a beaker. A cleaning process was performed by ultrasound for 1 hr. The negative electrode was removed, and an area of the negative electrode active material layer Example 4

To a flask, 0.404 M of 1,4-phenylene diisocyanate (MDI), 0.400 M of anhydrous trimellitic acid (TMA) and 1400 g of N-methyl-2-pyrrolidone (NMP) were added and heated to 120° C. in about 3 hrs with stirring. Then 0.004 M of anhydrous phthalic acid was added and maintained at 120° C. for 5 hrs to give a solution in which a concentration of the polyamideimide represented by formula (5) (PAI-C, the number average molecular weight 40,000) obtained as a final polymer was 7 wt %.

(5)

A laminate secondary battery was prepared using the same method as in Example 1 except for preparing a coating liquid for a negative electrode active material layer in which PAI-C was used instead of PAI-A. The same charge/discharge cycle as in Example 1 was performed, and adhesion maintenance of a negative electrode active material layer was determined. The result is shown in Table 1.

Example 5

A laminate secondary battery was prepared using the same method as in Example 1 except for preparing a coating liquid for a negative electrode active material layer in which the amount of 4,4'-diphenylenemethane diisocyanate (MDI) used was changed to 0.300M and the resulting polyamideimide represented by formula (6) (PAI-D, the number average molecular weight 41,000) was used. The same charge/discharge cycle as in Example 1 was performed, and adhesion maintenance of a negative electrode active material layer was determined. The result is shown in Table 1.

(6)

Example 6

A laminate secondary battery was prepared using the same method as in Example 1 except for preparing a coating liquid for a negative electrode active material layer in which the amount of 4,4'-diphenylenemethane diisocyanate (MDI) was changed from 0.303M to 0.300 M, the amount of anhydrous trimellitic acid was changed from 0.300M to 0.303M, and the resulting polyamideimide represented by formula (7) (PAI-E, the number average molecular weight 41,500) was used. The same charge/discharge cycle as in Example 1 was performed, and adhesion maintenance of a negative electrode active material layer was determined. The result is shown in Table 1.

(7)

Example 7

A laminate secondary battery was prepared using the same method as in Example 1 except for preparing a coating liquid for a negative electrode active material layer in which carbodi-imide (V05: manufactured by NISSHINBO) was used instead of carbodiimide (V02-B (isocyanate end-blocked): manufactured by NISSHINBO). The same charge/discharge cycle as in Example 1 was performed, and adhesion maintenance of a negative electrode active material layer was determined. The result is shown in Table 1.

Example 8

A laminate secondary battery was prepared using the same method as in Example 1 except for preparing a coating liquid for a negative electrode active material layer in which mass ratio of artificial massive graphite powder, PAI-A, carbon black and carbodiimide was changed to 89:8:1:2. The same charge/discharge cycle as in Example 1 was performed, and adhesion maintenance of a negative electrode active material layer was determined. The result is shown in Table 1.

Comparative Example 1

4,4'-oxydiphenylene diamine (ODA) of 0.300 M was dissolved in 1700 g of N-methyl-2-pyrr-olidone (NMP), and 0.303 M of biphenyltetracarboxylic acid dianhydride (BPDA) powder was slowly added with vigorously stirring. The resulting polymer mixture was stirred for 24~48 hrs. A solution was obtained in which a concentration of the polyamic acid (PAA, the average molecular weight 39,000) represented by formula (8) obtained as a final polymer was 7 wt %.

(8)

(9)

A coating liquid for a negative electrode active material layer was prepared using the same method as in Example 1 except for using PAA instead of PAI-A. We tried to fabricate a negative electrode, but the coating liquid for a negative electrode active material layer was changed to a gel state, so that a uniform coating film cannot be formed on a current collector. We failed to fabricate any electrode.

Comparative Example 2

A laminate secondary battery was prepared using the same method as in Example 1 except for preparing a coating liquid for a negative electrode active material layer in which artificial graphite powder, PAI-A and carbon black were used at mass ratio of 89:10:1 without carbodiimide. The same charge/discharge cycle as in Example 1 was performed, and adhesion maintenance of a negative electrode active material layer was determined. The result is shown in Table 1.

Comparative Example 3

4,4'-diphenylmethane diisocyanate (MDI) of 0.300 M was dissolved in 1700 g of N-methyl-2-pyrrolidone (NMP), and anhydrous trimellitic acid (TMA) of 0.303 M was slowly added with vigorously stirring. The resulting polymer mixture was stirred for 24~48 hrs. A solution was obtained in which a concentration of the polyamic acid (PAI-F, the average molecular weight 38,000) represented by formula (9) obtained as a final polymer was 7 wt %.

A coating liquid for a negative electrode active material layer was prepared using the same method as in Example 1 except for using PAI-F instead of PAI-A. We tried to fabricate a negative electrode, but the coating liquid for a negative electrode active material layer was changed to a gel state, so that a uniform coating film cannot be formed on a current collector. We failed to fabricate any electrode.

TABLE 1

| | Binder | Terminal functional group of Polyamideimide | Terminal functional group of Carbodiimide | Content of carbodiimide (weight % with respect to the sum weight of carbodiimide and polyamideimide) | Coating ability | Adhesion maintenance (%) |
|---|---|---|---|---|---|---|
| Example 1 | PAI-A | None | | 1 | Excellent | 80 |
| Example 2 | PAI-A | None | None | 5 | Excellent | 85 |
| Example 3 | PAI-B | None | None | 1 | Excellent | 75 |
| Example 4 | PAI-C | None | None | 1 | Excellent | 60 |
| Example 5 | PAI-D | Carboxylic acid, Acid andydride, NCO, NH$_2$ | None | 1 | Good | 50 |
| Example 6 | PAI-E | Carboxylic acid, Acid andydride | None | 1 | Good | 50 |
| Example 7 | PAI-E | Carboxylic acid, Acid andydride | Existence | 1 | Good | 75 |
| Example 8 | PAI-A | None | None | 20 | Excellent | 30 |
| Com. Ex. 1 | PAA (Amic acid) | Carboxylic acid, Anhydrous carboxylic acid | None | 1 | Bad | |
| Com. Ex. 2 | PAI-A | None | — | — | Excellent | 10 |
| Com. Ex. 3 | PAI-F (Amic acid) | Carboxylic acid, Acid andydride | None | 1 | Bad | |

From these results, it is demonstrated that the lithium secondary batteries according to the present invention have lowered deterioration during repeated charging and discharging, good cycle properties and prolonged life.

This application incorporates the full disclosure of JP Patent Application No. 2011-125348 filed Jun. 3, 2011 herein by reference.

The present invention is applicable to all of industrial fields that require power supply and industrial fields that relate to transmission, storage and supply of electrical energy. Specifically, the present invention is applicable to power supply for mobile devices such as mobile phone, notebook computer as well as automobiles.

The invention claimed is:

1. A negative electrode for lithium secondary batteries comprising a negative electrode active material layer comprising a binder for lithium secondary batteries comprising a polyamideimide and a carbodiimide and a negative electrode active material comprising a silicon oxide, wherein the carbodiimide has the number average molecular weight not less than 3,000 and not more than 50,000 and the polyamideimide has the number average molecular weight not less than 5,000 and not more than 100,000.

2. A lithium secondary battery having an electrode active material layer comprising a binder for a lithium secondary batteries comprising a polyamideimide and a carbodiimide and an electrode active material, wherein the carbodiimide has the number average molecular weight not less than 3,000 and not more than 50,000 and the polyamideimide has the number average molecular weight not less than 5,000 and not more than 100,000.

3. An automobile having a lithium secondary battery according to claim 2.

4. A negative electrode for lithium secondary batteries comprising a negative electrode active material layer comprising a negative electrode active material and a binder comprising a polyamideimide and a carbodiimide, wherein a content of the carbodiimide is not less than 0.5 wt % and not more than 20 wt % with respect to the polyamideimide, and wherein the carbodiimide has the number average molecular weight not less than 3,000 and not more than 50,000.

5. The negative electrode for lithium secondary batteries according to claim 4, wherein functional groups of the polyamideimide are blocked by a blocking agent.

6. The negative electrode for lithium secondary batteries according to claim 5, wherein as the blocking agent, one or more selected from a monoamine, a monoalcohol, a monocarboxylic acid and monoisocyanate be used.

7. The negative electrode for lithium secondary batteries according to claim 4, wherein the polyamideimide is able to dissolve or disperse in a solvent.

8. A method for producing the negative electrode for lithium secondary batteries according to claim 4, comprising mixing a polyamideimide, a carbodiimide and a solvent.

9. The negative electrode for lithium secondary batteries according to claim 4, wherein the negative electrode active material comprises a silicon oxide.

10. The negative electrode for lithium secondary batteries according to claim 9, wherein a content of the negative electrode active material is not less than 70 wt % and not more than 99 wt %.

11. A lithium secondary battery having the negative electrode according to claim 4.

12. A method for producing a lithium secondary battery according to claim 11, comprising a negative electrode active material layer using a coating liquid comprising an electrode active material, a polyamideimide, a carbodiimide and a solvent, wherein a content of the carbodiimide is not less than 0.5 wt % and not more than 20 wt % with respect to the polyamideimide.

13. An automobile having a lithium secondary battery according to claim 11.

14. A negative electrode for lithium secondary batteries comprising a negative electrode active material layer comprising a binder for lithium secondary batteries comprising a polyamideimide and a carbodiimide, and a negative electrode active material, wherein the carbodiimide has the number average molecular weight not less than 3,000 and not more than 50,000 and the polyamideimide has the number average molecular weight not less than 5,000 and not more than 100,000.

* * * * *